United States Patent [19]

York

[11] 4,043,365

[45] Aug. 23, 1977

[54] AUTOMATIC SCREW DRIVER HAVING BRAKE RESPONSIVE BALL CLUTCH MEANS

[76] Inventor: George York, 1232C Sunset Lane, Martinsville, N.J. 08836

[21] Appl. No.: 687,637

[22] Filed: May 18, 1976

[51] Int. Cl.² .......................... B25B 23/4; F16D 7/00
[52] U.S. Cl. .............................. 144/32 R; 192/93 C; 81/52.4 R
[58] Field of Search ............... 29/211 R, 212, 240; 192/56 R, 110 R, 93 C; 81/52.4 R, 52.4 A; 144/32

[56] References Cited

U.S. PATENT DOCUMENTS

| | | |
|---|---|---|
| 1,124,981 | 1/1915 | Weaver .............................. 192/93 C |
| 2,611,464 | 9/1952 | Rabe ................................. 192/93 C |
| 2,886,075 | 5/1959 | Skoog ................................... 144/32 |
| 3,613,751 | 10/1971 | Juhasz ................................ 144/32 |
| 3,616,883 | 11/1971 | Sindelar .............................. 144/32 |
| 3,642,039 | 2/1972 | McGee ................................ 144/32 |
| 3,803,952 | 4/1974 | Whale, Jr. ........................ 144/32 X |

Primary Examiner—Othell M. Simpson
Assistant Examiner—W. D. Bray
Attorney, Agent, or Firm—Carella, Bain, Gilfillan & Rhodes

[57] ABSTRACT

An automatic screwdriver apparatus is disclosed to include a ball clutch structure wherein engagement and disengagement of the ball clutch structure occurs in response to the arresting effect of independent brake means.

11 Claims, 14 Drawing Figures

POSITION #3

AUTOMATIC SCREW DRIVER HAVING BRAKE RESPONSIVE BALL CLUTCH MEANS

BACKGROUND OF THE INVENTION

This invention relates to assembly tools. More specifically this invention relates to automatic screwdriver equipment and component elements thereof.

Automatic screwdrivers of the type disclosed in this application are screwdrivers which are power operated and best suited for use in product assembly work.

Typical of the applications of such automatic screwdrivers is an assembly line operation wherein the assembled product includes a screw which has been partially or totally threaded into a suitable bore in the product. Where the product incorporates more than a single screw in its final assembly, more than one automatic screwdriver may be utilized in the assembly line. Typical of the products incorporating such partially threaded screws is the electrical receptacle which, in its consumer-available form, usually has box-attaching screws attached thereto.

Automatic screwdriver apparatus are known in the industry. Typical of the apparatus presently known and used is that shown in U.S. Pat. No. 2,989,996 for POWER OPERATED MECHANISM FOR ASSEMBLING THREADED FASTENERS.

The present invention also relates to a ball clutch apparatus appropriate for use in power equipment such as the screw driver of the present invention. Ball type clutches are known in the industry. Typical of the ball clutches presently known are those shown in U.S. Pat. Nos. 3,168,944, 3,693,381 and 3,726,432, which patents are submitted to be representative of the State of the art.

As will be recognized by those skilled in the art, however, certain operational disadvantages are present in the known automatic screwdriver structures which adversely affect their operation. Thus, known automatic screwdriver apparatus do not incorporate structure for positively limiting the degree of advance of the screw into a bore and physically terminating the rotation of the screwdriver bit at a point of total advancement. Further, known apparatus have not incorporated positive engagement clutch means capable of disengagement upon the completion of screw advance and positive re-engagement upon commencement of a next subsequent screwdriving cycle.

Additionally known ball type clutches suffer from a lack of positive lock-out during the disengagement phase of their operation. Such lack of lock-out results in unacceptable chatter and fatigue in the clutch which is both undesirable and damaging.

BRIEF DESCRIPTION OF THE INVENTION

It is an object of the present invention, therefore, to provide an improved automatic screwdriver both in terms of structural and operational capabilities.

A further object of the present invention is to provide an automatic screwdriver apparatus incorporating a positive advance limiting means, which limiting means terminates rotation of the screw being advanced at a preselected position.

A still further object of the present invention is to provide an automatic screwdriver apparatus incorporating a ball clutch but having such ball clutch operating in response to positive structural occurrences in the operational cycle of the apparatus.

Yet another object of the present invention is to provide a ball cluth means which effects positive lock-out of the ball means during the disengaged phase of operation.

Still a further object of the present invention is to provide a ball clutch wherein engagement and disengagement occurs in response to positive independent braking.

Yet an additional object of the present invention is to provide an automatic screwdriver which is quickly vertically adjustable to accommodate various screw setting positions.

These objects and others not enumerated are achieved by the automatic screwdriver apparatus according to the invention, one embodiment of which may include a driver bit for rotationally driving the screw into a bore, rotation imparting motor means for imparting rotational motion to the driver bit, reciprocation imparting motor means for imparting reciprocating motion to the driver bit, ball clutch means disposed between the rotation imparting motor means and the driver bit to permit disengagement of thee rotaation imparting motor means from the driver bit in response to an arresting of the rotational motion of the driver bit, and a driver bit brake for arresting the rotational motion of the driver bit at a selected position of advance of the screw into the bore whereby to limit the advance of the driver bit and to cause disengagement of the ball clutch.

BRIEF DESCRIPTION OF THE DRAWINGS

A more complete understanding of the present invention may be had in the light of the following detailed description thereof particularly when read in the light of the accompanying drawings wherein.

DETAILED DESCRIPTION

As stated above, this invention relates to an automatic screwdriver apparatus and a unique ball clutch mechanism for use therewith.

Figures 1, 14:
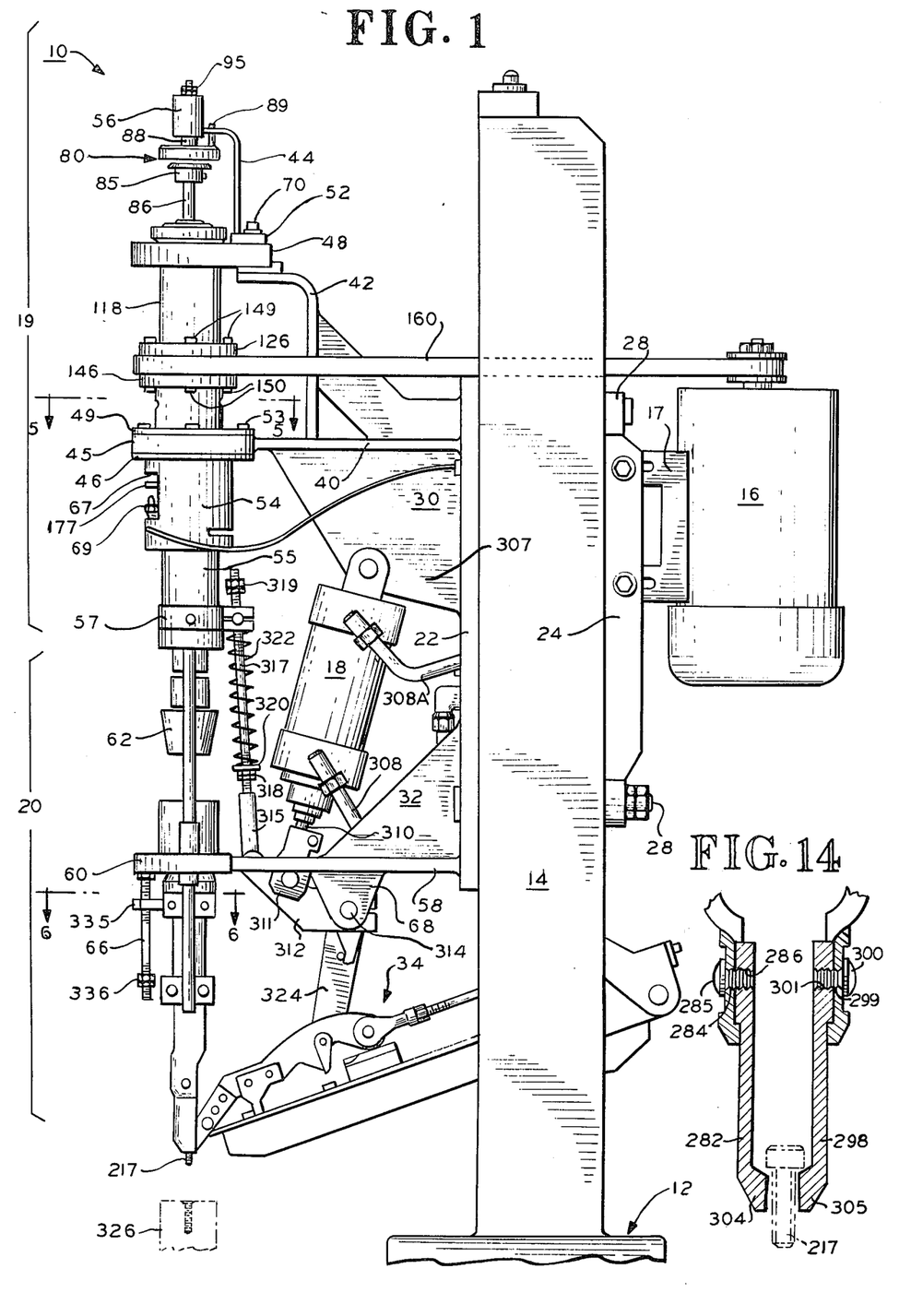
FIG. 1 is a elevational side view of screwdriver apparatus according to the invention.
FIG. 14 is a detailed enlarged view partly in section of the jaw structure of the screw driver of the present invention.

Referring therefore to FIG. 1, a screw driver apparatus is shown and designated generally by the reference numeral 10. Apparatus 10 can be seen to include a stable base pedestal 12 and a stable base column 14. Pedestal 12 may be the bed of a machine of which apparatus 10 forms a part, or any other firm base suitable for supporting heavy line equipment. Stable base column 14 is rigidly secured to or integral with pedestal 12 and extends vertically with respect to pedestal 12. Stable base column 14 defines a support for the operative mechanisms of apparatus 10 including a drive motor 16 supported from a motor mount 17, pneumatic operator 18, a drive and clutching structure designated generally by the reference numeral 19 and a screw driver mechanism designated generally by reference numeral 20.

Slidably mounted on stable base column 14 are a vertically adjustable base 22 and a motor mount 24 which is adjustable both horizontally and vertically. Adjusable base 22 defines a support means for pneumatic operator 18, drive and clutching structure 19 and screw driver mechanism 20. Motor mount 17 defines a support means for drive motor 16. Adjustable base 22 and adjustable motor mount 17 are secured to opposed sides of stable base column 14 by bolts 28 which, when tightened, draw the adjustable base 22 and adjustable motor mount 17 tightly against opposed surfaces of stable base column 14. Thus, by loosening bolts 28, an operator may adjust vertically adjustable base 22 and adjustable motor mount 17 to a desired elevation with respect to stable base pedestal 12 and thereafter resecure the bolts to lock the base 22 and motor mount 17 with respect to stable base column 12.

Adjustable base 22 includes an upper support section 30 and a lower support section 32. As is discussed below in detail, upper support section 30 provides rigid support for the drive and clutching structure 19 as well as for pneumatic operator 18 of apparatus 10. Lower support section 32 provides rigid support for screw driver mechanism 20. Lower support section 32 may also provide rigid support for a screw feeder mechanism such as the one shown e.g. in FIGS. 1 and 3 and designated generally by reference numeral 34. In this regard screw feed mechanism 34 may be any of the many which are generally known to those having skill in these arts.

Figure 3:
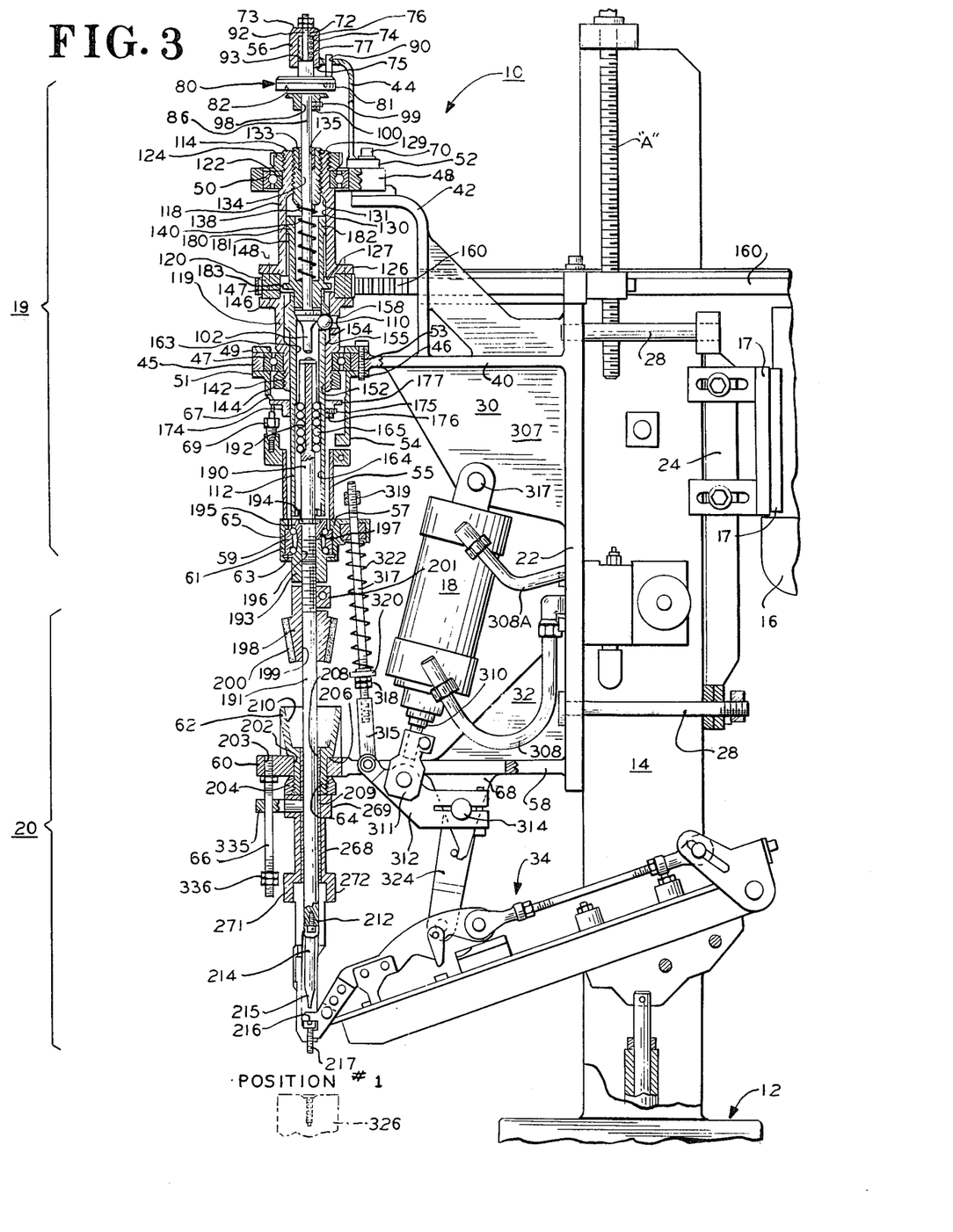
FIG. 3 is a elevational view similar to FIG. 1, with portions of the structure shown in cross-section and at position 1 in the operational cycle of the apparatus.

As best may be seen from FIG. 3, the drive and clutching structure of apparatus 10 is supported at three vertically displaced levels by upper lateral support arm 40, upper main bearing support post 42 and reset brake support post 44.

Thus, upper lateral support arm 40 rigidly engages and supports a cylindrical bearing support element 45 which comprises a portion of a spline housing 46. Cylindrical bearing support element 45 encases lower main bearing 47 as is discussed below in detail. Similarly, upper main bearing support post 42 defines a structural support for bearing support element 48 which encases upper main bearing 50 as is discussed below in detail.

Extending generally upwardly from an upper support post pedestal 52 which may be integral with bearing support element 48 is reset brake bracket support post 44. Post 44 provides rigid support for reset brake bracket 56 which operates in conjunction with other elements of the drive and clutching structure 19 of apparatus 10, all as discussed below in detail.

Lower support section 32 provides rigid support for screw driver mechanism 20. Thus, lower support section 32 includes a lower lateral support arm 58 which extends normally outwardly from the vertical section of adjustable base 22. On the end of lateral support arm 58 distal from the vertical section of adjustable base 22 is a shaft-brake support housing 60 through which is rigidly received shaft support cylinder 64 of brake drum 62. In the embodiment shown brake drum 62 and shaft support cylinder 64 are integral.

Also mounted on shaft-brake support housing 60 is a depth limiter rod 66 the specific structure and operation of which is discussed below in detail.

Rigidly secured to and depending from lower lateral support arm 58 is a pivot support plate 68. Pivot support plate 68 defines the principle reaction structure for pneumatic operator 18 and its associated linkages as well as for screw feed mechanism 34.

The above identified structures which are rigidly secured to adjustable base 22 are structures which, during the operation of apparatus 10, neither rotate nor reciprocate. As is discussed below in detail, other elements of apparatus demonstrate a rotational or reciprocating motion during operation and in some cases a combination of both.

Considering, therefore, the detailed structure of apparatus 10, and with initial reference to FIG. 3, it can be seen that the drive and clutching structure 19 of apparatus 10 is supported by upper lateral support arm 40. Disposed on the end of lateral support arm 40 distal from adjustable base 22 is cylindrical bearing support element 45. Bearing support element 45 is disposed concentrically outwardly of lower main bearing 47 and is in surface-to-surface contact with the external surface of the outer race thereof. Bearing 47 is restrained against vertically upward movement by a retainer ring 49 the outer surface of which is equal in radius to support element 45. Retainer ring 49 is of a radially extending depth such as to overlap the outer race of bearing 47 thereby to restrain the bearing from vertically upward movement.

Disposed below lower main bearing 47 and in surface-to-surface contact with bearing support element 45 and the lower surface of the outer race of bearing 47 is a radially outwardly extending annular shoulder 51 formed integrally with spline housing 46. Cylindrical bearing support element 45, retainer ring 49 and spline housing 46 are rigidly secured together by a plurality of bolts 53 which extend through matched holes in the ring 49, support element 45 and shoulder 51. In the embodiment shown, the holes in shoulder 51 are tapped to accommodate rigid securing of the respective structures, one to the other.

Annular shoulder 51 is integral with the main cylindrical body of spline housing 46. In this regard spline housing 46 can be seen to comprise an upper cylindrical section 54 and a lowr cylindrical section 55. Lower cylindrical section is smaller in diameter than upper section 54 and may be integral with or secured e.g. by shrink fitting to a bore formed in the lower end of upper cylindrical section 54.

Disposed coaxially below lower cylindrical section 55 of spline housing 46 and in abutting engagement therewith in operational position 1 as shown in FIG. 3, is thrust housing 57. Thrust housing 57 is a generally cylindrical member within which is positioned outer thrust race 59 of a thrust bearing 61. Outer thrust race 59 is retained rigidly within thrust housing 57 by an internal snap ring 63 which is received resiliently within an annular groove formed in thrust housing 57, which internal snap ring retains outer thrust race 59 within thrust housing 57 such as to cause a surface-to-surface engagement of the upper surface of race 59 with annular shoulder 65 formed on the inner surface of housing 57.

Figures 2, 5, 6:
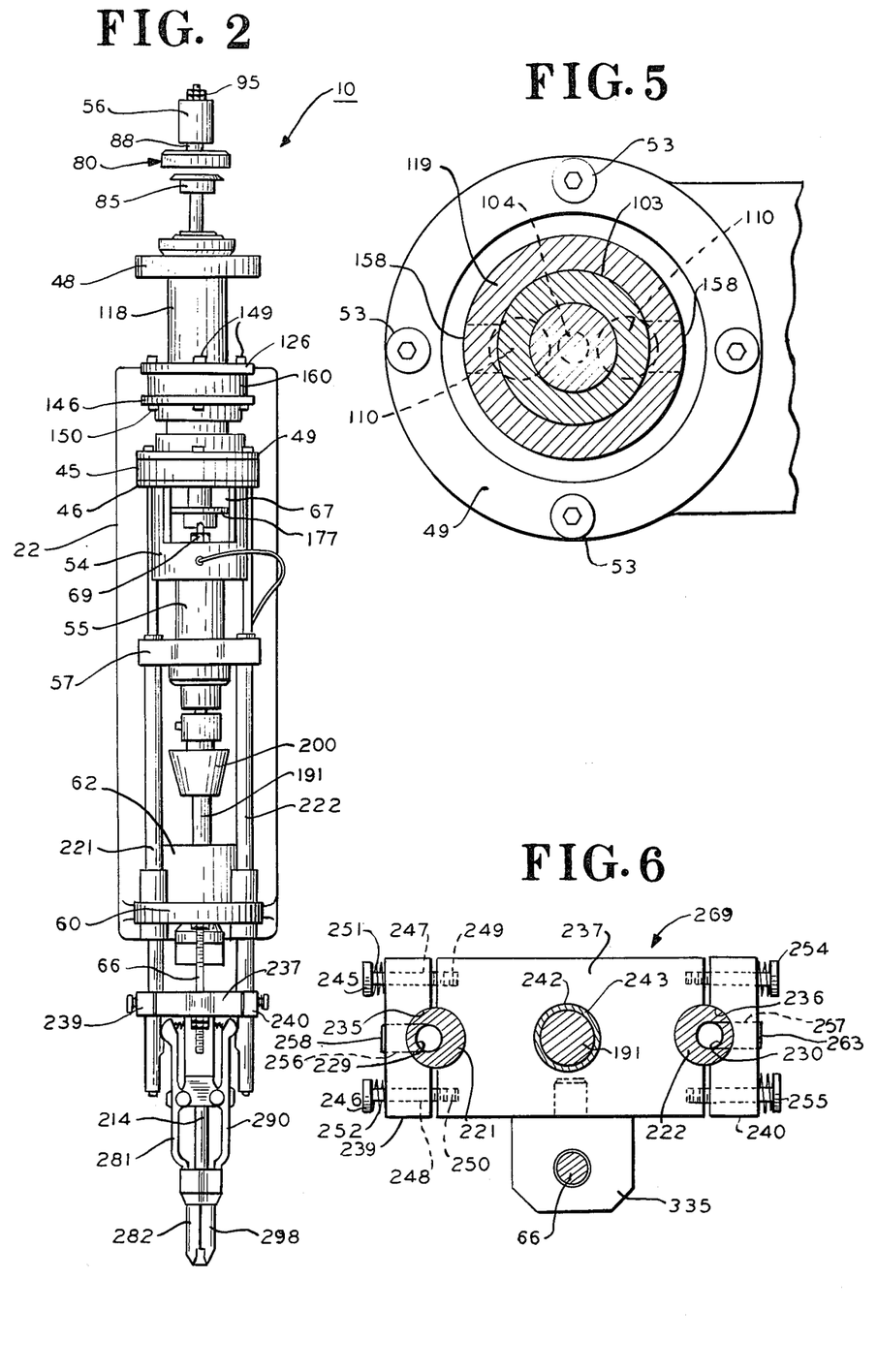
FIG. 2 is a elevational front view of screwdriver apparatus according to the invention.
FIG. 5 is a cross-sectional view through the plane 5—5 of FIG. 1.
FIG. 6 is a cross-sectional view through the plane 6—6 of FIG. 1.

As best may be seen in FIG. 2, an opening 67 is formed in the wall of the upper cylindrical section 54 of spline housing 46, within which opening is provided a pressure relief return valve 69. As is discussed below in detail, pressure relief return valve 69 is utilized to relieve the pressure in a valve (not shown) which controls pneumatic operator 18 such as to provide for the return cycle of the apparatus during operation.

Returning to FIG. 3 it is seen that rigidly supported by upper main bearing support post 42 is upper main bearing support element 48. Support element 48 is provided with a cylindrical inner surface which is in contact with the outer cylindrical surface of the outer race of upper main bearing 50.

Disposed on one portion of the upper surface of bearing support element 48 is upper support post pedestal 52. Pedestal 52, support element 48 and upper main bearing support post 42 are provided with coaxial bores to accommodate the passage therethrough of a pair of machine bolts 70 (only one shown). In this regard the bores formed in upper main bearing support post 42 are tapped so as to permit the rigid assembly of post 42, pedestal 52 and upper main bearing support element 58 through the use of bolts 70.

Extending upwardly from upper support post pedestal 52 is reset brake support post 44 which is rigidly secured to pedestal 52 by welding or the like. Rigidly secured to post 44, also by welding or the like, is reset brake bracket 56. (Seen more clearly in FIG. 13). Bracket 56 is a generally cylindrical member having a bore 72 extending axially therethrough from its upper surface 73 to a counter bore 74 which extends coaxially longitudinally with bore 72 from the lower surface 75 of bracket 56 through a portion of its axial length. The plane of joinder of bore 73 and counter-bore 74 defines an annular shoulder 76 which acts as a reaction surface for one end of reset brake spring 77.

Figure 13:
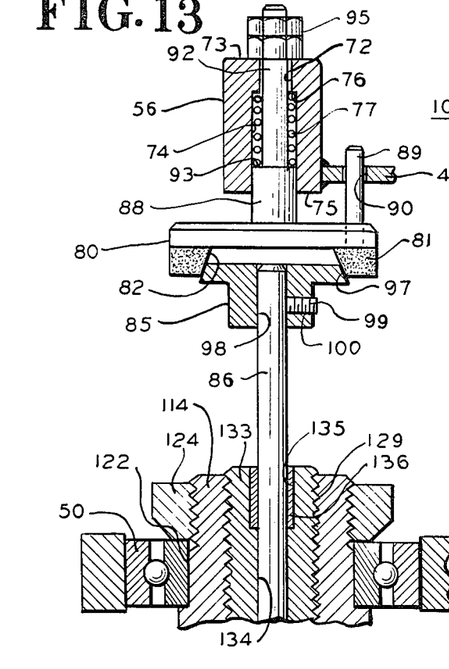
FIG. 13 is an enlarged partial sectional view of the reset braking mechanism of the clutch structure according to the invention.

Also in FIG. 13 it can be seen that reciprocably received within counterbore 74 of reset brake bracket 56 is a reset brake lining designated generally by the reference numeral 80. Reset brake lining 80 is a monolithic element having a generally cylindrical lining portion 81 at its lower extremity with a frusto-conical bore 82 formed therein. As is discussed below in detail, bore 82 is complementary in shape to the surface of reset brake 85 and cooperates therewith to restrict rotation of a reset shaft 86.

Extending coaxially upwardly from cylindrical lining portion 81 is a lower cylindrical lining shaft section 88. The outer surface of shaft section 88 is substantially equal to or slightly smaller than the diameter of counter bore 74 such as to permit reciprocation of shaft section 88 within counter bore 74. Spaced eccentrically of shaft section 88 and exteding vertically upwardly from the upper surface of lining portion 81 is a guide pin 89. Pin 89 is reciprocally received through a bore 90 formed in post 44 and acts as a reaction element to preclude rotation of lining 81 during the performance of its braking function.

Extending coaxially upwardly from lower shaft section 88 is upper cylindrical lining shaft section 92. The outer surface of shaft section 92 is substantially equal to or slightly smaller than the diameter of bore 72 in reset bracket 56 such as to permit unrestricted reciprocation therethrough. The plane of joinder of lower shaft section 88 and upper shaft section 92 defines an annular shoulder 93, the surface of which defines the action surface for the lower end of reset brake spring 77.

The upper portion of the surface of shaft section 92 is threaded to accommodate the securing thereon of a pair of locking nuts 95. Thus locking nuts 95 may be displaced upwardly or downwardly along upper shaft section 92 to adjust the compressive force in spring 77 and to limit the downwardly extended position of brake lining 80.

As noted above, reset brake lining 80 is provided with frusto-conical bore 82 which is shaped substantially identically to a frusto-conical surface 97 formed on reset brake 85. Brake 85 is otherwise a generally cylindrical member having bore 98 extending axially therethrough. Bore 98 is sized to slidably receive reset shaft 85 to which reset brake 85 is secured by a set screw 99 which is threadedly received within a tapped radially extending bore 100 formed in brake 85.

Figures 4, 7:
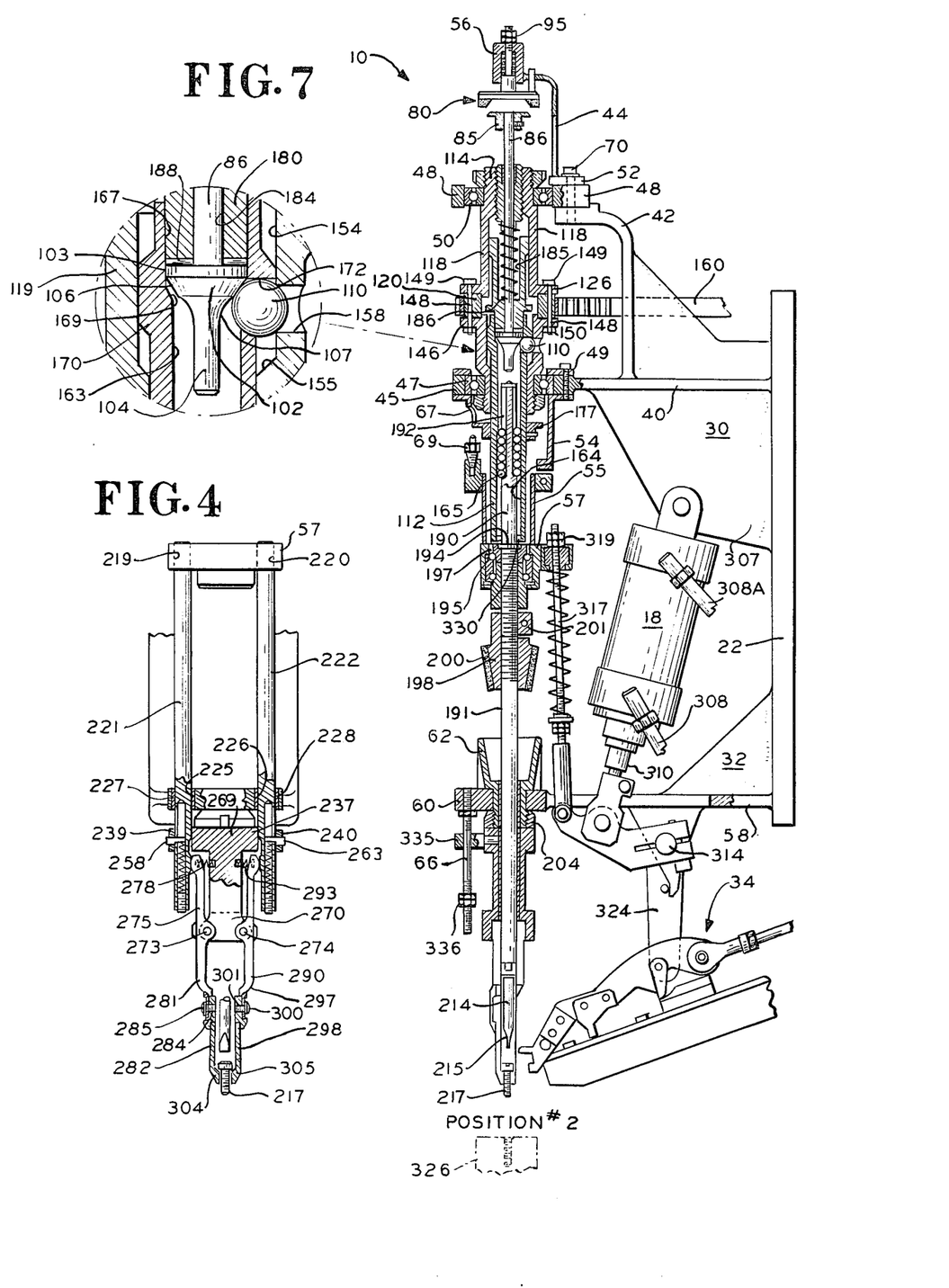
FIG. 4 is a partial front-elevational view of the jaw and screw driver mechanism of the apparatus with the components being in position 1 in the operational cycle of the apparatus.
FIG. 7 is a cross-sectional elevation view similar to FIG. 3 but showing the apparatus at the start of position 2 in the operational cycle.

As best may be seen in FIG. 7 and its enlarged section, there is formed on the lower end of shaft 86 a pressure cone 102. Pressure cone 102 is a part of the clutch mechanism, the operation of which is described below in detail. Structurally, pressure cone 102 includes an upper cylindrical surface 103 and a lower cylindrical surface 104. Disposed between cylindrical surfaces 103 and 104 are a frusto-conical surface 106 and a curvilinear surface 107. Frusto-conical surface 106 extends downwardly and inwardly from upper cylindrical surface 103 to a circle of intersection with curvilinear surface 107. Curvilinear surface 107 develops from being tangent to lower cylindrical surface 104 to the circle of intersection with frustoconical surface 106. The radius of development of curvilinear surface 107 is substantially equal to the radius of each of a plurality of clutch balls 110 as will be discussed below. Similarly, the cone angle of frusto-conical surface 106 is complementary to the angle of a frusto-conical surface which is relieved from the inner surface of a spline driver 112 all as described in detail below.

As discussed generally above, the upper support section 30 of adjustable base 22 ultimately provides rigid structural support for lower main bearing support element 45 and upper main bearing support element 48. Received within lower and upper main bearing support elements 45, 48 are lower and upper main bearings 47 and 50, respectively. The inner races of main bearings 47 and 50 are rigidly secured to a rotary spindle 114 which rotates about a vertical axis which is coaxial with the axis of shaft 86.

Rotary spindle 114 in the embodiment shown is a generally cylindrical element comprising three sections, an upper cylindrical section 118, a lower cylindrical section 119 and a drive pulley 120 rigidly secured therebetween.

As seen best in FIG. 3 the outer surface of upper cylindrical section 118 is relieved adjacent its upper end to define an annular channel 122 having a smooth lower surface and a threaded upper surface. The lower surface of annular channel 122 is of a diameter substantially equal to the diameter of the inner race of upper main bearing 50. The threaded upper surface of channel 122 accommodates the threaded engagement of a bearing nut 124 which bears against the upper radial surface of the inner race of main bearing 50 and urges the lower radial surface of the inner race of main bearing 50 against the radial shoulder defined by the relief in forming channel 122. Thus by tightening bearing nut 124 against the inner race of bearing 50, the bearing is retained rigidly against longitudinal movement along rotary spindle 114.

Formed in the lower end of upper cylindrical section 118 is a radially outwardly extending flange 126. Flange 126 is displaced slightly upwardly from the lowermost end of upper cylindrical section 118 to define a boss 127 which is received within the central portion of drive pulley 120.

Extending vertically centrally of upper cylindrical section 118 is a first axially extending bore 129 and a counter bore 130 coaxial therewith. Bore 129 extends from the upper surface of section 118 to meet bore 129. Formed at the joinder of bore 129 and counterbore 130 is a frusto-conical shoulder 131. Bore 129 is threaded to accommodate therein a torque adjusting screw 133.

Torque adjusting screw 133 is a generally cylindrical element having threads formed throughout the length of its outer surface. Extending axially through screw 133 is a bore 134 which is sized to accommodate the slidable passage therethrough of reset shaft 86. The upper end of bore 134 is relieved to define an annular channel 135 in which is mounted a cylindrical bushing 136. Bushing 136 permits sliding movement of reset shaft 86 while at the same time providing radial support. Formed on the lower end of torque adjusting screw 133 is a cylindrical boss 138 which extends downwardly and defines a positioning boss for receiving thereover the upper end of a torque spring 140. In this regard torque spring 140 bears against the lower radial surface of adjusting screw 133 as a reaction surface.

Positioned coaxially below upper cylindrical section 118 is lower cylindrical section 119. The outer lower surface of lower cylindrical section 119 is relieved to define an annular channel 142 having a smooth upper surface and a threaded lower surface. The upper surface of annular channel 142 is of a diameter substantially equal to the diameter of the inner race of lower main bearing 47. The threaded lower surface of channel 142 accommodates the threaded engagement of a bearing nut 144 which bears against the lower radial surface of the inner race of lower main bearing 47 and urges the upper radial surface of the inner race of lower main bearing 47 against the radial shoulder defined by the relief in forming channel 142. Thus, by tightening bearing nut 144 against the inner race of bearing 47, the bearing is retained rigidly against longitudinal movement along the lower section 119 of rotary spindle 114.

Formed on the upper end of lower cylindrical section 119 is a radially outwardly extending flange 146. Flange 146 is displaced slightly downwardly from the upper end of lower cylindrical section 119 to define a boss 147 which is received within the central portion of drive pulley 120. In this regard, flange 126 of upper cylindrical section 118, flange 146 of lower cylindrical section 119 and drive pulley 120 are provided with a plurality of vertically extending matched bores 148 (more clearly shown in FIG. 7) through which extend bolts 149. Nuts 150 are provided on bolts 149 and when tightened, they tend to draw flanges 126 and 146 tightly against drive pulley 120 such as to rigidly secure pulley 120 against flanges 126 and 146 for unitary rotation with upper and lower cylindrical sections 126, 146 of rotary spindle 114.

Again in FIG. 3, extending vertically centrally of lower cylindrical section 119 is a first axially extending bore 152 and a counterbore 154 coaxial therewith. Bore 152 extends from the lower surface of section 119 axially upwardly through a portion of its length. Counter bore 154 which is of a larger diameter than bore 152, extends axially downwardly from the upper surface of section 119 to meet bore 152. Formed at the joinder of bore 152 and counter bore 154 is a frusto-conical shoulder 155.

The inner surface of bore 152 is smooth and of a diameter substantially equal to or slightly larger than the outside diameter of spline driver 112 such as to permit relative rotational and reciprocating movement between rotary spindle 114 and spline driver 112.

Disposed between frusto-conical shoulder 155 and the upper end of lower section 119 are two bores 158 (see FIG. 7) which extend radially through the wall of lower section 119 from the surface of counterbore 154. Bores 158 are of a diameter which is smaller than the diameter of clutch balls 110 and cooperate with clutch balls 110 to comprise a portion of the drive and clutching structure 19 of apparatus 10.

As noted above, there is disposed within lower cylindrical section 119 of rotary spindle 114 and also within spline housing 46 a spline driver 112. Spline driver 112 is a generally cylindrical member which is coaxial with rotary spindle 114, reset brake shaft 86 and other elements of apparatus 10. In this regard it should be noted that the principal operational elements of apparatus 10 are coaxial with the longitudinal central axis of a screw 217 which is to be driven.

As noted above spline driver 112 is a generally cylindrical member having a longitudinal bore 163 extending axially through its length. Formed in the surface of bore 163 and extending longitudinally from the lower surface of spline driver 112 through a portion of its length are a plurality of lands 164 which accommodate the receipt therein of spline balls 165.

The upper end of bore 163 is relieved to define a counterbore 167 (See FIG. 7) which extends axially downwardly from the upper surface of spline driver 112. Formed at the juncture of bore 163 and counterbore 167 is a frusto-conical shoulder 169. The structural angle of frusto-conical shoulder 169 corresponds to the structural angle of frusto-conical surface 106 of pressure cone 102.

Formed on the upper external surface of spline driver 112 is an annular shoulder 170 the outer diameter of which is substantially equal to the diameter of counterbore 154 of lower cylindrical section 119. Annular shoulder 170 is provided with two radially extending bores 172. Bores 172 are of a diameter which is substantially equal to or slightly greater than the diameter of clutch balls 110 to permit their reception therethrough. It should also be noted that the outside diameter of the main portion of spline driver 112 is substantially equal to or slightly less than the internal diameter of bore 154 in section 119. The bearing effect thus created permits spline driver 112 to rotate and receiprocate within lower cylindrical section 119 without experiencing radial displacement.

As seen best in FIG. 3, rigidly secured to the outer surface of spline driver 112 is a return rotor 174. Return rotor 174 is a generally cylindrical member having a central bore which is substantially equal in diameter to the outside diameter of spline driver 112. Return rotor 174 is rigidly secured to spline driver 112 by a set screw 175 which threadedly engages a radially extending bore 176 and may be adjusted to rigidly engage the surface of spline driver 112. Formed on the upper end of return rotor 174 is a radially outwardly extending flange 177. Flange 177 is of sufficient diameter to extend within opening 67 in spline housing 46 and to contact with the plunger of return valve 69 such as to cause operation of the valve upon completion of a screw driving stroke as is discussed below in detail.

Disposed principally within upper cylindrical section 118 of rotary spindle 114 is a cylindrical retainer 180. Cylindrical retainer 180 comprises a main cylinder portion 181 having an outer surface which is somewhat smaller in diameter than counter-bore 130 in cylindrical section 118. Formed on the upper portion of the outer surface of cylindrical retainer 180 is an annular shoulder 182 the surface diameter of which is substantially equal to or slightly smaller than the diameter of counter bore 130 such as to permit a sliding relationship therebetween. Formed in the lower end of retainer 180 is a radially outwardly extending flange 183. Flange 183 is of a diameter which is larger than the diameter of counterbore 154 in lower cylindrical section 119 of rotary spindle 114. Such larger diameter is intended to provide limitation of downward movement of retainer 180 within rotary spindle 114 by the engagement of flange 183 with the upper radial surface of boss 147 formed on lower section 119 above flange 146. (For engaged position see FIG. 11).

Cylindrical retainer 180 is coaxial with the various cylindrical components of rotary spindle 114 and is provided with a longitudinal bore 184 which extends axially from the lower surface of retainer 180 throughout a portion of its length. Bore 184 is of such a diameter as to permit the sliding contact therethrough of reset shaft 86. Formed above bore 184 and extending axially from the upper surface of retainer 180 is a counter bore 185 (See e.g. FIGS. 7 & 9). Counter-bore 185 is larger in diameter than bore 184 and cooperates therewith to define at their plane of intersection a radially extending shoulder 186. Shoulder 186 defines the action surface for the lower end of torque spring 140 which surrounds reset shaft 86 and is compressed to tend to force retainer 180 downwardly within upper cylindrical section 118. As noted above, however, such downward movement is limited by the engagement of flange 183 with the radial surface of boss 147.

In FIG. 7, disposed between the lower radial surface of retainer 180 and the upper radial surface of pressure cone 102 are a plurality of needle bearings 188. Needle bearings 188 accommodate relatively frictionless movement when there occurs relative rotary motion between pressure cone 102 and retainer 180.

Positioned to rotate with and reciprocate within spline driver 112 is spline shaft 190. Spline shaft 190 defines an integral part of drive shaft 191 and comprises a cylindrical shaft element having an outside diameter which is substantially equal to or slightly less than bore 163 of spline driver 112 to provide a free sliding fit therewith. The upper end of spline shaft 190 is relieved to define a plurality of longitudinally extending lands 192 which are spaced to be co-axial with lands 164 to define a spline driver for transmitting rotational motion from spline driver 112 to spline shaft 190. Thus spline driver 112 provides for the transmission of rotary motion between spline driver 112 and spline shaft 190 notwithstanding relative axial reciprocation between spline driver 112 and spline shaft 190.

Referring again to FIG. 3, spline shaft 190 is coaxial with and rigidly secured to drive shaft 191 by the lower section 193 of the inner race 195 of thrust bearing 61. More specifically, thrust bearing 61 is disposed within thrust housing 57 and includes an outer race 59 and an inner race 195 separated by two sets of ball bearings in the conventional manner. Inner race 195 includes a lower section 193 and an upper section 197 which are coaxial and through which extends a coaxial longitudinally vertically extending bore 196. Bore 196 through both the upper and lower sections of inner race 195 is threaded to accommodate therethrough threaded portions of spline shaft 190 and drive shaft 191 as discussed below.

The lower end of spline shaft 190 has formed thereon an annular shoulder 194 below which the surface of the spline shaft is threaded. Annular shoulder 194 is received within an annular groove formed in the upper surface of upper section 197 of inner race 195. During assembly the upper section 197 of the inner race 195 is threaded on spline shaft until annular shoulder 194 is seated within the annular groove in the upper section 197. Thereafter the thrust bearing is assembled such that the lower portion 193 of the inner race is threaded on the lower end of spline shaft 190. With the thrust bearing so assembled, the threaded upper end of drive shaft 191 may be screwed into bore 196 in the lower portion of inner race 195.

Disposed below thrust bearing 61 and mounted on the threaded portion of drive shaft 191 is a brake rotor 198. Brake rotor 198 is a generally cylindrical member having a threaded bore 199 extending longitudinally axially therethrough. Threaded bore 199 rigidly engages the threaded surface of main drive shaft 191 for rotation and reciprocation therewith. Additionally, there is formed on the upper portion of rotor 198 a lock collar 201 which permits the brake rotor to be locked in position on drive shaft 191. Formed on the lower external surface of brake rotor 198 is a frusto-conical brake surface 200. As is discussed below in detail, brake surface 200 cooperates with brake drum 62 to arrest the rotation and downward motion of drive shaft 191 at the bottom of an operational stroke.

Referring now to the lower structure of screw driver apparatus 10, it can be seen that lower support section 32 of adjustable base 22 provides rigid support for screw driver mechanism 20. Thus, lower lateral support arm 58 supports shaft brake support housing 60, the housing 60 being generally rectangular and secured to arm 58 for example by welding. Formed centrally of housing 60 is a longitudinally extending axial bore 202. Also formed in housing 60 is a longitudinally extending eccentrically disposed bore 203. Bore 203 is tapped to accommodate the threaded reception therein of depth limiter rod 66. As noted above, there extends through bore 202 of housing 60 the shaft support cylinder 64 of brake drum 62, which cylinder and drum are integral in the embodiment shown. Shaft support cylinder 64 is a cylindrical member the outside diameter of which is substantially equal to the diameter of bore 202 such as to be snugly received therein. The lower outer surface of cylinder 64 is threaded to accommodate therein a bearing nut 204. Brake drum 62 comprises a generally cylindrical member the outside diameter of which is substantially larger than the outside diameter of cylinder 64 such as to cooperate therewith to define radially extending shoulder 206. Thus, as bearing nut 204 is tightened on cylinder 64, shoulder 206 is drawn tightly against the upper surface of housing 60 such as to rigidly maintain cylinder 64 and brake drum 62 in position with respect to housing 60.

Also in FIG. 3, extending longitudinally axially through cylinder 64 is a bore 208. The diameter of bore 208 is slightly larger than the outside diameter of drive shaft 191 in order to accomodate therebetween a cylindrical sleeve bushing 209. Bushing 209 defines a bearing surface to aid the rotation and reciprocation of main drive shaft 191 within cylinder 64.

Formed in brake drum 62 is a frusto-conical counter bore 210 which extends from the upper end of drum 62 downwardly to communicate with bore 208. Counter bore 210 is coaxial with bore 208 and its frusto-conical surface is complementary to the outer surface 200 of brake rotor 198 such as to cooperate therewith, when engaged, to preclude rotation of drive shaft 191.

Drive shaft 191 extends downwardly through cylinder 64 and is provided at its lower end with a longitudinally axially extending tapped bore 212 which is adapted to threadedly receive therein a drive bit 214. Drive bit 214 is provided with a tapered edge 215 on its lower end which is receivable within the slot 216 of screw 217 being driven such as to impart rotational driving force thereto.

Figure 10:
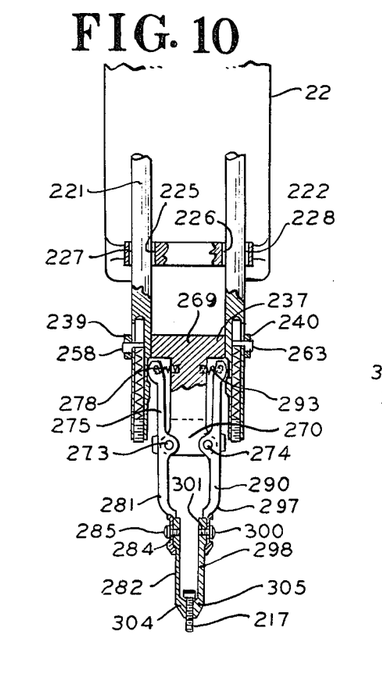
FIG. 10 is a partial front-elevational view similar to the view of FIG. 4 but the components being in position 3 of the operational cycle.
Figure 12:
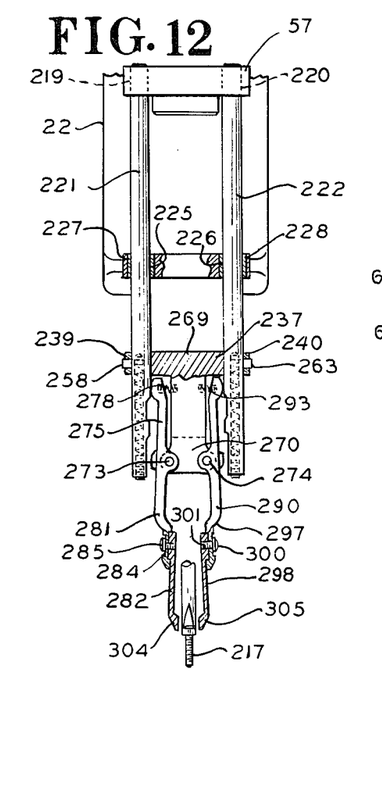
FIG. 12 is a partial front-elevational view similar to the view of FIG. 4 but with the components being in position 4 of the operational cycle.

As best may be seen in FIGS. 2, 4 and 12 thrust housing 57 extends transversely outwardly on either side of the thrust bearing 61 and is provided with parallel bores 219 and 220 extending therethrough on opposite sides of drive shaft 191. The axes of bores 219 and 220 are coplanar with the axis of drive shaft 191. Rigidly secured within bores 219 and 220 are parallel, vertically extending control rods 221 and 222, respectively. Control rod 221 extends downwardly through a vertical bore 225 formed in shaft brake support sleeve 60. Similarly, control rod 222 extends downwardly through a vertical bore 226 formed in shaft brake support housing 60. As is event from FIGS. 4, 10 and 12, the diameters of bores 225, 226 are slightly greater than the outside diameters of control rods 221, 222 so as to accommodate therebetween sleeve bushings 227 and 228 respectively. Bushings 227 and 228 which are rigidly received within bores 225 and 226 respectively are provided to establish radial support for control rods 221 and 222 while permitting free sliding of the rods therethrough.

Each of control rods 221 and 222 is solid throughout the major portion of its length. Formed in the base of each, however, is a longitudinally extending, eccentrically outwardly displaced bore 229, 230 respectively (see FIG. 8). Each of bores 229, 230 is tapped at its lower portion to accommodate therein the threaded reception of set screws 231, 232.

The lower ends of control rods 221 and 222 extend through bores 235, 236 (see FIG. 6) which are formed by the cooperation of a jaw carrier 237 in cooperation with a pair of opposed clampshoes 239 and 240. More specifically, as best may be seen in FIGS. 6 and 8, there is slidably mounted on drive shaft 191 a jaw carrier 237. Jaw carrier 237 is provided with a centrally disposed longitudinally axially extending bore 242 in which is provided a sleeve bearing 243 which accommodates the rotating, sliding passage therethrough of drive shaft 191.

Clamp shoes 239 and 240 are resiliently secured to jaw carrier 237 to establish a sliding frictional relationship between jaw carrier 237 and control rods 221, 222. Thus, clamp shoe 239 is resiliently secured to jaw carrier 237 by a pair of bolts 245, 246 which extend through parallel smooth bores 247, 248 in clamp shoe 239 and which are threadedly received in tapped bores 249, 250 provided in jaw carrier 237. The resilient securing is provided by the positioning of springs 251, 252 between the heads of bolts 245, 246 and the other surface of clamp shoe 239, respectively. Clamp shoe 240 is resiliently secured to jaw carrier 237 through the use of spring loaded bolts 254, 255 in the same manner as discussed with respect to clamp shoe 239 and bolts 245, 246.

Formed centrally of clamp shoes 239, 240 are transversely extending bores 256, 257 respectively. Bore 256 in clamp shoe 239 accommodates the press fit reception therein of a dowel pin 258, one end of which is relieved to define a flat surface 259. The end of dowel pin 258 extends radially into bore 229 through a vertically extending slot 260 formed in rod 221 such that flat surface 259 defines an action surface against which compression spring 261 exerts a force.

Similarly, bore 257 in clamp 240 accommodates the press fit reception therein of a dowel pin 263, one end of which also is relieved to define a flat surface 264. The end of dowel pin 263 extends radially into bore 230 through a vertically extending slot 265 formed in rod 221 such that flat surface 264 defines an action surface against which spring 266 exerts a force. In this regard it is evident from FIG. 8 that springs 261 and 266 are contained within bores 229 and 230 respectively between their respective dowel pins 258, 263 and set screws 231, 232. Thus, springs 261 and 266 tend to displace jaw carrier 237 upwardly with respect to control rods 221, 222. As is discussed below in detail, such relative movement between jaw carrier 237 and control rods 221, 222 occurs when the force exerted by springs 261, 266 is greater than the frictional forces created by the resilient mounting of jaw carrier 237 on rods 221, 222 through the use of resiliently loaded clamp shoes 239, 240. When the forces exerted by springs 261, 266 are not sufficient to displace jaw carrier 237 relatively to control rods 221, 222, the jaw carrier 237 and elements supported thereby move together as a unit.

Referring again to FIGS. 4, 10 and 12, it can be seen that jaw carrier 237 comprises a central portion 268 which is generally rectangular in cross-section, an upper portion 269 as described in detail with respect to FIG. 6, and a lower portion 270 which is bifurcated to define a fork having spaced first and second carrier elements 271, 272. Carrier elements 271 and 272 are each provided with a pair of aligned bores through which are received a first pivot pin 273 and a second pivot pin 274.

Figure 8:
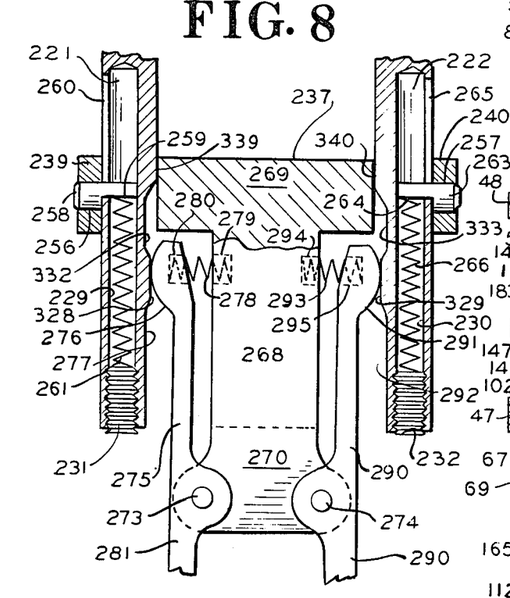
FIG. 8 is substantially the same as FIG. 4 but enlarged.

As best may be seen with reference to FIG. 8 there is pivotally mounted on first pivot pin 273, between carrier elements 271 and 272, a first jaw holder 275. First jaw holder 275 is a generally elongated member having a transversely extending bore formed generally centrally therein to receive first pivot pin 273. Formed on the upper extremity of first jaw holder 275 is an outwardly facing cam follower 276 which is urged against a cam surface 277 formed on control rod 221 by a spring 278. One end of spring 278 is received within a bore 279 formed in jaw carrier 237. The other end of spring 278 is received within a bore 280 formed in the upper inner surface of jaw holder 275. Thus, spring 278 tends to force the upper end of jaw holder 275 outwardly such as to cause cam follower surface 276 to be in surface-to-surface contact with cam surface 277 on control rod 221. The lower end 281 of first jaw holder 275 defines a mounting element for rigidly mounting first jaw element 282 (see FIG. 14) thereon. Thus there is formed in the lower end 281 of first jaw holder 275 a transversely extending bore 284 for receiving therethrough a screw 285 which is threadedly received within a tapped bore 286 formed in first jaw element 282 to rigidly secure jaw element 282 to first jaw holder 275.

Pivotally mounted on second pivot pin 274 between carrier elements 271 and 272 is a second jaw holder 290. Second jaw holder 290 is substantially identical to but opposite hand from first jaw holder 275. Thus, second jaw holder 290 is a generally elongated member having a transversely extending bore formed generally centrally therein to receive second pivot pin 274. Formed on the upper extremity of second jaw holder 290 is a outwardly facing cam follower 291 which is urged against a cam surface 292 on control rod 222 by a spring 293. One end of spring 293 is received within a bore 294 formed in jaw carrier 237. The other end of spring 293 is received within a bore 295 formed in the upper inner surface of second jaw holder 290. Thus, spring 293 tends to force the upper end of jaw holder 290 outwardly such as to cause cam follower surface 291 to be in surface-to-surface contact with cam surface 292 on control rod 222.

The lower end 297 of second jaw holder 290 defines a mounting element for rigidly mounting second jaw element 298 thereon. Thus, there is formed in the lower end 297 of second jaw holder 290 a transversely extending bore 299 for receiving therethrough a screw 300 which is threadedly received within a tapped bore 301 formed in second jaw element 298 to rigidly secure second jaw element 298 to second jaw holder 290. Formed on the lower end of each of first and second jaw elements 282, 298 are inwardly facing shoulders 304, 305 respectively. Each of shoulders 304, 305 is provided with an arcuate relieved portion which cooperate to define a gripping means for holding rigidly a screw 217 therebetween. Thus, the shoulders 304, 305 of jaw elements 282, 298 cooperate to position and retain a screw 217 such as to accommodate advancement of driver bit 214 and rotation thereof to permit tapered edge 215 to operatively engage slot 216 for purposes of threading screw 217 into a workpiece 326.

As will be evident to those skilled in this art, the detailed description of apparatus 10 has been limited, thus far, to the structure and operating mechanism for imparting rotational forces to driver bit 214. In order for apparatus 10 to operate fully, however, it is necessary that means be provided to impart reciprocating motion to driver bit 214 and therewith to other elements of the apparatus. Such means is pneumatic operator 18.

More specifically and referring again to FIG. 3, apparatus 10 includes pneumatic operator 18 which may be selected from any of the pneumatic operators generally available commercially. Pneumatic operator 18 is pivotally secured to gusset plate 307 which forms a part of upper support section 30. Air for pneumatic operator 18 is provided through air supply hoses 308 and 308A which connect the pneumatic operator with a source of compressed air (not shown). Operator 18 includes an output rod 310 which is rigidly secured to a structural fork 311. Fork 311 is pivotally engaged to a link 312 which in turn is pivotally supported at one end by a pivot pin 314 which extends outwardly from pivot support plate 68. The end of link 312 distal from pivot pin 314 is pivotally connected to a clevis 315. Rigidly received within the upper aperture of clevis 315 is the lower end of a downfeed pull rod 317. The lower and upper ends of downfeed pull rod 317 are threaded to receive lower and upper nut pairs 318 and 319 respectively.

Lower nut pair 318 adjustably supports a collar 320 which defines the action surface for the lower end of a compression spring 322. The upper end of compression spring 322 bears against the lower surface of thrust housing 57 and thereby tends to displace thrust housing 57 upwardly. Downfeed pull rod 317 extends through a swivel collar formed in thrust housing 57 whereabove upper nut pair 319 is provided to limit the downward stroke of downfeed pull rod 317 through thrust housing 57.

Rigidly secured to link 312 for rotation therewith about pivot pin 314 is a feeder arm 324 which provides power to screw feeder mechanism 34 to facilitate its operation.

Operation of apparatus 10 best may be described with reference to FIGS. 3, 7, 9 and 11 which show the relative positions of components of apparatus 10 during various phases of its operation. Commencing with FIG. 3, the apparatus 10 is shown in a position which has been designated arbitrarily as position number 1. In position number 1 the screwdriver is idling in retracted position and a screw 217 has been pushed into jaws 282, 298 in position to be advanced and screwed into workpiece 326. More specifically, driver motor 16 is driving gearbelt 160 to cause rotation of the rotary spindle 114 at the clutch housing, including lower cylindrical section 119, to rotate. In position number 1, clutch balls 110 are set in bores 158 and transmit the rotational motion of the clutch housing to spline driver 112. Clutch balls 110 are urged into bores 158 by the force of torque spring 140 bearing against pressure cone 102 through retainer 180. The frusto-conical surface 106 of pressure cone 102 transmits the spring force to balls 110 urging them radially outwardly.

The rotation of spline driver 112 is transmitted to spline shaft 190 through spline balls 165 and thereafter to drive shaft 191 through the structure of inner race 195 of thrust bearing 61. Because driver bit 214 is rigidly secured to drive shaft 191 it rotates therewith.

Output rod 310 of pneumatic operator 18 is in its retracted position thus causing downfeed pull rod 317 to be in its uppermost position thereby causing compression of spring 322. Thus driver bit 214 is disposed above screw 217 and screw 217 is disposed above workpiece 326. In this regard it should be noted that in position number 1, cam follower surfaces 276 and 291 are engaged with inner displacement cam surfaces 328, 329 of cam surfaces 277 and 292 respectively causing jaw shoulders 304, 305 to be partially separated thus permitting the screw feed mechanism to advance a screw into position between jaw elements 282 and 298.

Position 2 of the operation of apparatus 10 is shown in FIG. 7. In FIG. 7 pneumatic operator 18 is actuated to cause downward displacement of output rod 310 thus causing upper nut pair 319 to engage the upper surface of thrust housing 57 and causing the fingers of the screw feeder mechanism to retract from jaw elements 282 and 298. As the output rod 310 of pneumatic operator 18 continues its advance, tapered edge 215 of driver bit 214 engages slot 216 in screw 217 into workpiece 396.

Continued extension of output rod 310 causes upper nut pair 319 to displace thrust housing 57 downwardly and therewith spline shaft 190 and driver shaft 191. In this regard it will be recognized that downward displacement of spline shaft 190 within spline driver 112 does not interfere with the transmission of rotary motion from spline driver 112 to spline shaft 190. Thus, as spline shaft 190 moves downwardly, spline balls 165 roll downwardly within the spline lands 164 and 192. The downward displacement of spline shaft 190 is limited by the provision of a spline ball retainer 330 which, absent other displacement limiting apparatus, would limit the downward displacement of spline shaft 190 and drive shaft 191.

Additionally, the continued extension of output rod 310 beyond position 2 causes thrust housing 57 to be displaced downwardly, which displacement is transmitted through control rods 221 and 222. It should be noted that in position 1, compression springs 261 and 266 are in their most compressed positions, dowel pins 258 and 263 being in the lowermost possible positions within slots 260 and 265. Thus, as thrust housing 57 is displaced downwardly, control rods 221 and 222 are displaced downwardly causing relative movement between jaw carrier 237 and control rods 221, 222 such as to cause cam follower surfaces 276 and 291 to slide from inner displacement cam surfaces 328, 329 to screwlock cam surfaces 332, 333 thus causing jaw elements 282 and 298 to firmly grip screw 217.

Figure 9:
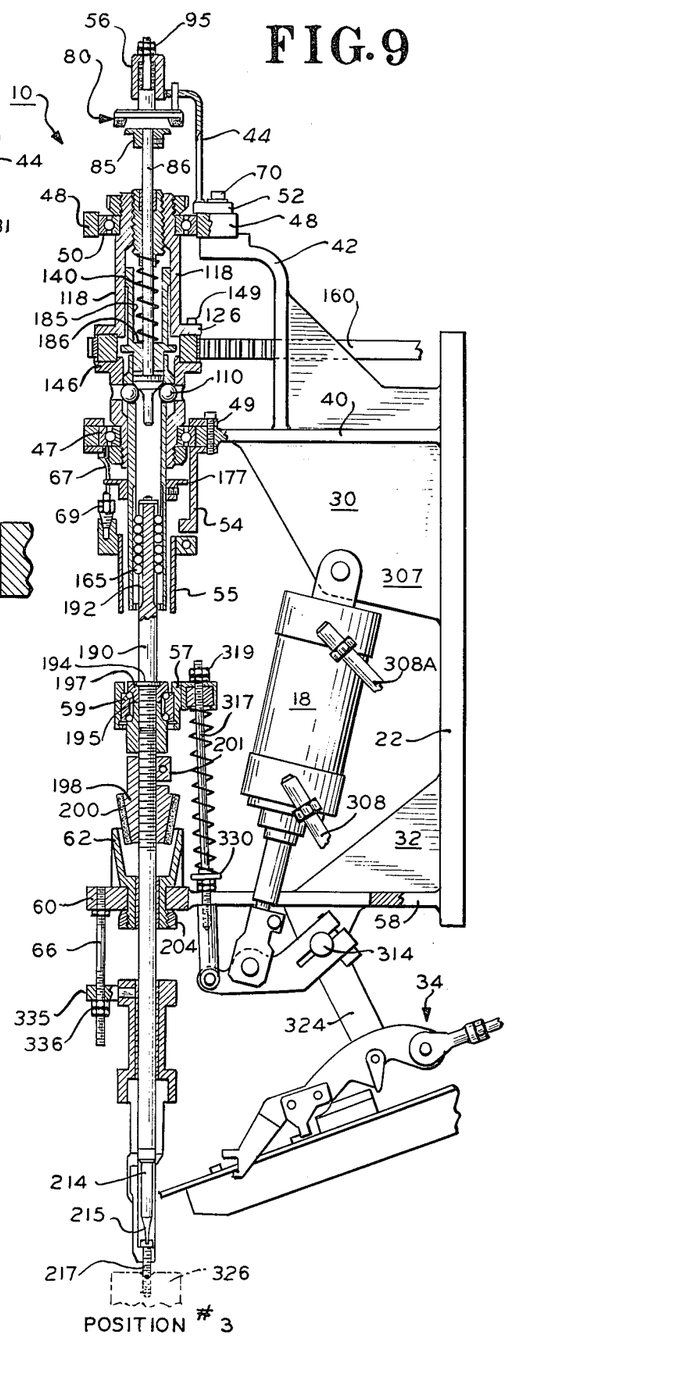
FIG. 9 is a corss-sectional elevational view similar to FIG. 3 but showing the apparatus at position 3 in the operational cycle.

FIG. 9 (designated as operating position 3) shows that continued advance of output rod 310 of pneumatic operator 18 causes still further downward displacement of downfeed pull rod 317 and therewith thrust housing 57 is displaced downwardly. The spring force on springs 261 and 266 is diminished until it is no longer greater than the frictional forces generated by shoe clamps 239 and 240 thus causing jaw carrier 237 and control rods 221 and 222 to operate as a unit. The downward displacement of jaw carrier 237 is limited, however, by depth limiter rod 66 which is threadedly secured to shaft brake support housing 60 as discussed above.

Upon the engagement of stop collar 335 with stop nut pair 336 on depth limiter rod 66, the downward motion of jaw carrier 237 is terminated. Still continued advancement of output rod 310 causes control rods 221, 222 to be displaced downwardly relative to jaw carrier 237 thus causing cam followers 276, 291 to engage the upper surfaces 339, 340 (FIG. 12) of control rods 221, 222. Such engagement causes outward displacement of shoulders 304, 305 of jaw elements 282, 298 thus causing release of screw 217.

Figure 11:
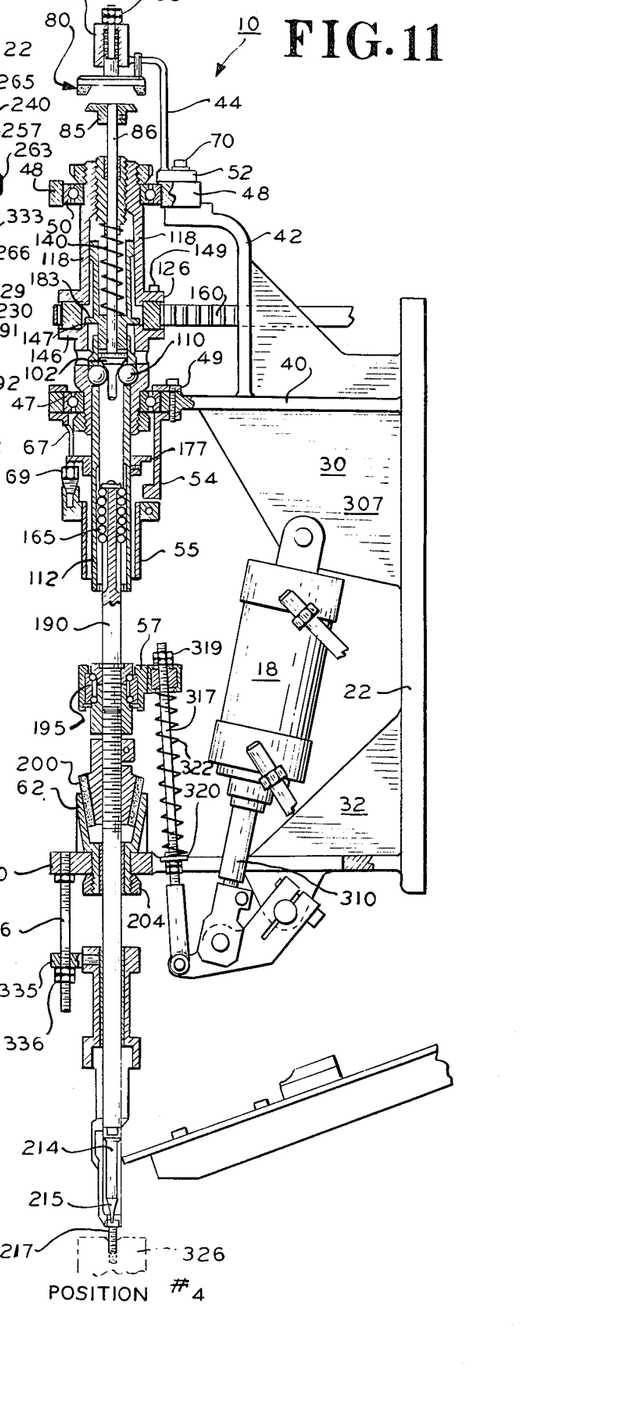
FIG. 11 is a cross-sectional elevational view similar to FIG. 3 but showing the apparatus at position 4 in the operational cycle.

FIG. 11 (designated as position No. 4) shows that as screw 217 advances into the workpiece, drive shaft 191 continues to be displaced downwardly until brake surface 200 of brake rotor 198 engages counter bore 210 in brake drum 62 thus causing the rotation of drive shaft 191 and therewith spline shaft 190 to terminate. The termination of rotation of spline shaft 190 causes a termination and restraint of the rotation of spline driver 112.

Although the engagement of brake surface 200 and counterbore 210 restrain spline shaft 190 and therewith spline driver 112 against rotation, the clutch housing continues to rotate. This relative rotation, of course, creates a force on clutch balls 110 which tends to displace them radially inwardly out of bores 158. The radially inward displacement of clutch balls 110 initially causes pressure cone 102 to be displaced upwardly so as to make room for the clutch balls within the confines of lower cylindrical section 119 of the clutch housing.

As clutch balls 110 clear bores 158, the force of torque spring 140 forces pressure cone 102 downwardly thereby displacing both the clutch balls 110 and spline driver 112 downwardly.

During the downward displacement clutch balls act effectively as a ball bearing between lower cylindrical section 119 and spline driver 112 and the clutch housing freewheels in rotation about the spline driver. It should also be noted that balls 110 are relieved of the pressure generated by spring 140 by reason of the engagement of shoulder 183 with surface 147 of lower cylindrical section 119.

Continued downward displacement of pressure cone 102, clutch balls 110 and spline driver 112 continues until radially outwardly extending flange 177 engages the actuator of pressure relief return valve 69. Such engagement causes the operating pressure in pneumatic operator 18 to be reversed causing the withdrawal of output rod 310 and the vertical upward displacement of downfeed pull rod 317.

The upward displacement of pull rod 317 causes thrust housing to be displaced upwardly by the action of spring 322. Thrust housing 57 continues to move upwardly until its upper surface engages the lower surface of spline driver 112. Still further upward displacement causes spline driver 112 to be displaced upwardly thus causing clutch balls 110 to be displaced upwardly and therewith pressure cone 102. Upward displacement of pressure cone 102 causes upward displacement of shaft 86 thereby causing reset brake 85 to engage the surface of frustoconical bore 82 of reset brake lining 80 thereby causing the reset brake mechanism to stop rotating (refer to FIG. 13). Such a termination of rotation establishes a relative motion between spline driver 112 and lower cylindrical section 119 of clutch housing thereby permitting the clutch balls 110 to be reseated in bores 158, such reseating re-establishes rotation of the system as a unit and prepared the apparatus for advancement of the next screw. The need for the reset braking mechanism may not be immediately apparent. However, it should be noted that frictional forces inherent in the system can cause spline driver 112 and clutch balls 110 to rotate at the same speed as the rotary spindle without balls 110 being reseated in bores 158. Reset brake 85 precludes this possibility by creating a relative motion between the balls 110 and cylindrical section 119. In this regard the reset brake is engaged only at that point in the elevation of pressure cone 102 at which balls 110 are in point contact with the line of intersection between curvilinear surface 107 and frustoconical surface 106. This, of course, defines the point of maximum elevation of pressure cone 102 and therewith reset brake 85.

It can be seen, therefore, that the screw driver of the present invention provides a device wherein advancement of the driver bit is limited by a positive brake, which brake also controls disengagement of the main shaft clutch means. Reengagement of the clutch is achieved in response to the operation of a second brake means. Thus, the screwdriver of the present invention permits driving a screw to a pre-selected depth by adjusting the vertical position of the brake means. Also, by disengaging the brake means and adjusting the spring force on spring 40, the clutch release mechanism may be set to a pre-selected force the effect of which is to permit tightening a screw to a pre-selected torque.

It will be recognized by those skilled in these arts that various modifications may be made to the disclosed embodiment without departing from the spirit and scope of the invention.

What is claimed is:

1. A screw driver apparatus comprising:
   a. base support means;
   b. rotational drive means including:
      a drive motor,
      a rotary spindle, and
      transfer means for transmitting rotary motion of said drive motor to cause rotary motion in said rotary spindle;
   c. drive shaft means mounted for both rotational and reciprocating motion;
   d. a driver bit rigidly mounted on said drive shaft means for rotating and reciprocating therewith, said drive bit for engaging a screw to be driven by said screw driver;
   e. spline drive means connecting said drive shaft means with said rotational drive means whereby to permit transfer of rotational motion to said drive shaft means notwithstanding concurrent reciprocating of said drive shaft means;
   f. ball clutch means disposed between said rotational drive means and said spline drive means, said ball clutch transmitting rotational motion from said rotational drive means to said spline drive means when engaged and permitting independent rotation of said rotational drive means with respect to said spline drive means when disengaged;
   g. brake means rigidly secured to said drive shaft means, said brake means including a shoe mounting element and a brake shoe rigidly secured to said shoe mounting element, said shoe mounting element being selectively positionable on said drive shaft whereby to adjust the amount of advancement of said drive bit prior to the occurrence of braking by said brake means, and further including a brake drum means mounted on said base support means for cooperating with said brake shoe to brake said drive shaft, said brake means for arresting rotational motion of said drive shaft means upon the occurrence of full advancement of said drive bit, said ball clutch means being disengageable in response to the arrest of rotational motion of said drive shaft means by said brake means; and
   h. reciprocating motor means for imparting reciprocating motion to said drive shaft means and therewith said drive bit.

2. A screw driver apparatus according to claim 1 including a threaded surface formed on said drive shaft, a longitudinally axially extending bore formed through said brake means, said bore in said brake means being tapped and threaded received on said threaded portion of said drive shaft, and wherein adjustment of the position of said brake means in said drive shaft is achieved by rotating said brake means on said drive shaft.

3. A screw driver apparatus according to claim 2 including a lock collar formed in said shoe mounting element, said lock collar for permitting adjustment of said brake means when unlocked and precluding adjustment of said brake means when locked.

4. A screw driver apparatus comprising:
   a. rotational drive means including:
      a drive motor,
      a rotary spindle, and
      transfer means for transmitting rotary motion of said drive motor to cause rotary motion in said rotary spindle;
   b. drive shaft means mounted for both rotational and reciprocating motion;
   c. a driver bit rigidly mounted on said drive shaft means for rotating and reciprocating therewith, said drive bit for engaging a screw to be driven by said screw driver; p1 d. spline drive means connecting said drive shaft means with said rotational drive means whereby to permit transfer of rotational motion to said drive shaft means notwithstanding concurrent reciprocating of said drive shaft means, said spline drive means comprising a generally cylindrical member disposed concentrically within said rotary spindle for rotation therein;
   e. ball clutch means disposed between said rotational drive means and said spline drive means, said ball clutch means including a plurality of arcuately spaced radially extending bores formed in said rotary spindle, a plurality of arcuately spaced radially extending bores formed in said spline drive, said arcuate spacing of said bores in said spline drive corresponding in arcuate displacement to said arcuate displacement of said bores formed in said rotary spindle, thereby to permit alignment of said bores, a plurality of ball elements, said plurality of ball elements being equal in number to the number of radially extending bores formed in said spline drive, each of said ball elements being larger in diameter than the diameter of said bores formed in said rotary spindle and smaller in diameter than said bores formed in said spline drive, and means for urging said plurality of balls radially outwardly through said bores in said spline drive and into said bores in said rotary spindle, said ball clutch for transmitting rotational motion from said rotational drive means to said spline drive means when engaged and for permitting independent rotation of said rotational drive means with respect to said spline drive means when disengaged;
   f. brake means rigidly secured to said drive shaft means, said brake means for arresting rotational motion of said drive shaft means upon the occurrence of full advancement of said drive bit, said ball clutch means being disengagable in response to the arrest of rotational motion of said drive shaft means by said brake means; and
   g. reciprocating motor means for imparting reciprocating motion to said drive shaft means and therewith said drive bit.

5. A screw driver apparatus according to claim 4 wherein said generally cylindrical spline drive defines a longitudinally axially extending cavity therethrough and wherein said means for urging said plurality of balls radially outwardly comprises:
   a cone member disposed reciprocably within said cavity, said cone member having a frusto-conical surface for engagement with said plurality of balls to urge said balls radially outwardly; and
   spring means for imparting longitudinally directed force against said cone member.

6. A screw driver apparatus according to claim 5 wherein said cone means includes an arcuate surface formed adjacent said frusto-conical surface, said arcuate surface being of a curvature substantially equal to the curvature of said balls, and said arcuate surface defining a bearing race surface operable when said clutch is in disengaged position.

7. A screw driver apparatus according to claim 6 and including a reset shaft secured to and extending longitudinally axially from said cone, a reset brake shoe mounted on said reset shaft, said reset brake shoe for engaging a reset brake drum in response to longitudinal displacement of said cone means and reset shaft, said engagement of said reset brake shoe with said reset brake drum to impede rotation of said cone and therewith said balls to create a differential speed between said balls and said rotary spindle.

8. Clutch means for operationally connecting a first rotating member and a second rotating member, said second rotating member being supported for both rotational and reciprocating motion, said clutch means comprising:
 a plurality of arcuately spaced radially extending bores formed in said first rotating member;
 a plurality of arcuately spaced radially extending bores formed in said second rotating member, said arcuate spacing of said bores in said second member corresponding in arcuate displacement to said arcuate displacement of said bores formed in said first rotating member, thereby to permit alignment of said bores of said first and second rotating members;
 a plurality of ball elements, said plurality of ball elements being equal in number to the number of radially extending bores formed in said second rotating member, each of said ball elements being larger in diameter than the diameter of said bores formed in said first rotating member and smaller in diameter than said bores formed in said second rotating member; and
 means for urging said plurality of balls radially outwardly through said bores in said second rotating member and into said bores in first rotatinng member.

9. Clutch means according of claim 8 wherein said second rotating member is generally cylindrical and defines a longitudinally axially extending cavity therethrough, and wherein said means for urging said plurality of balls radially outwardly comprises:
 a cone member disposed reciprocably within said cavity, said cone member having a frusto-conical surface for engagement with said plurality of balls to urge said balls radially outwardly; and
 spring means for imparting longitudinally directed force against said cone member.

10. Clutch means according to claim 9 wherein said cone means includes an arcuate surface formed adjacent said frusto-conical surface, said arcuate surface being of a curvature substantially equal to the curvature of said balls, and said arcuate surface defining a bearing race surface operable when said clutch is in disengaged position.

11. Clutch means according to claim 10 including a reset shaft secured to and extending longitudinally axially from said cone, a reset brake shoe mounted on said reset shaft, said reset brake shoe for engaging a reset brake drum in response to longitudinal displacement of said cone means and reset shaft.

* * * * *